Oct. 7, 1969 T. WEISZ 3,471,718

HYSTERESIS CONTROL FOR A SCHMITT TRIGGER CIRCUIT

Filed March 24, 1966

INVENTOR.
T. WEISZ

BY
Frank R. Trifari
AGENT

United States Patent Office 3,471,718

Patented Oct. 7, 1969

3,471,718

HYSTERESIS CONTROL FOR A SCHMITT TRIGGER CIRCUIT

Thomas Weisz, Ossining, N.Y., assignor, by mesne assignments, to U.S. Philips Corporation, New York, N.Y., a corporation of Delaware Filed Mar. 24, 1966, Ser. No. 537,071

Int. Cl. H03k *3/26*

U.S. Cl. 307—290 9 Claims

This invention relates to trigger circuits, and more in particular to improved Schmitt trigger circuits in which control of hysteresis may be achieved without substantial deterioration of the frequency characteristics of the circuit.

It is well known that hysteresis can be reduced in Schmitt trigger circuits by suitable selection of the circuit components, and that a condition of zero hysteresis can be achieved when the loop gain of such a circuit is unity. The conventional approach to the reduction of hysteresis, however, generally results in a reduction in the switching speed and cycle speed of the circuit.

It is therefore an object of this invention to provide a Schmitt trigger circuit having means for reducing the effects of hysteresis without greatly affecting the frequency characteristics of the circuit.

A further object of the invention is to provide an economical and simple means for controlling the hysteresis effect in a Schmitt trigger circuit, whereby the switching speed of the circuit is not substantially reduced, and the stability of the circuit is not substantially affected.

According to the invention, a Schmitt trigger circuit is provided including switch means responsive to the conductive state of one of the amplifier devices in the trigger circuit for controlling the response of the circuit to input voltages. The switch means may, for example, control the voltage across the common feedback resistor as a function of the conductive state of the output amplifier device. By thus providing the hysteresis control means externally of trigger circuit loop, the trigger circuit may be designed to have the optimum switching speed characteristics without the necessity of compromising these characteristics for the sake of reduced hysteresis.

Figure 1:
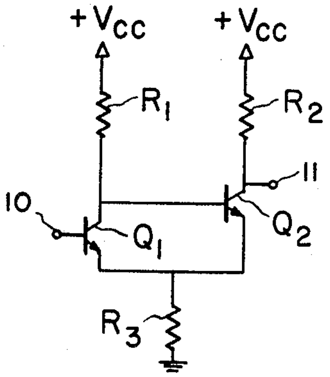
Fig. 1 Prior Art
Figure 2:
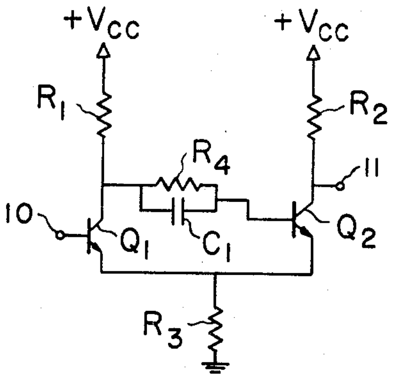
Fig. 2 Prior Art
Figures 3, 4, 5:
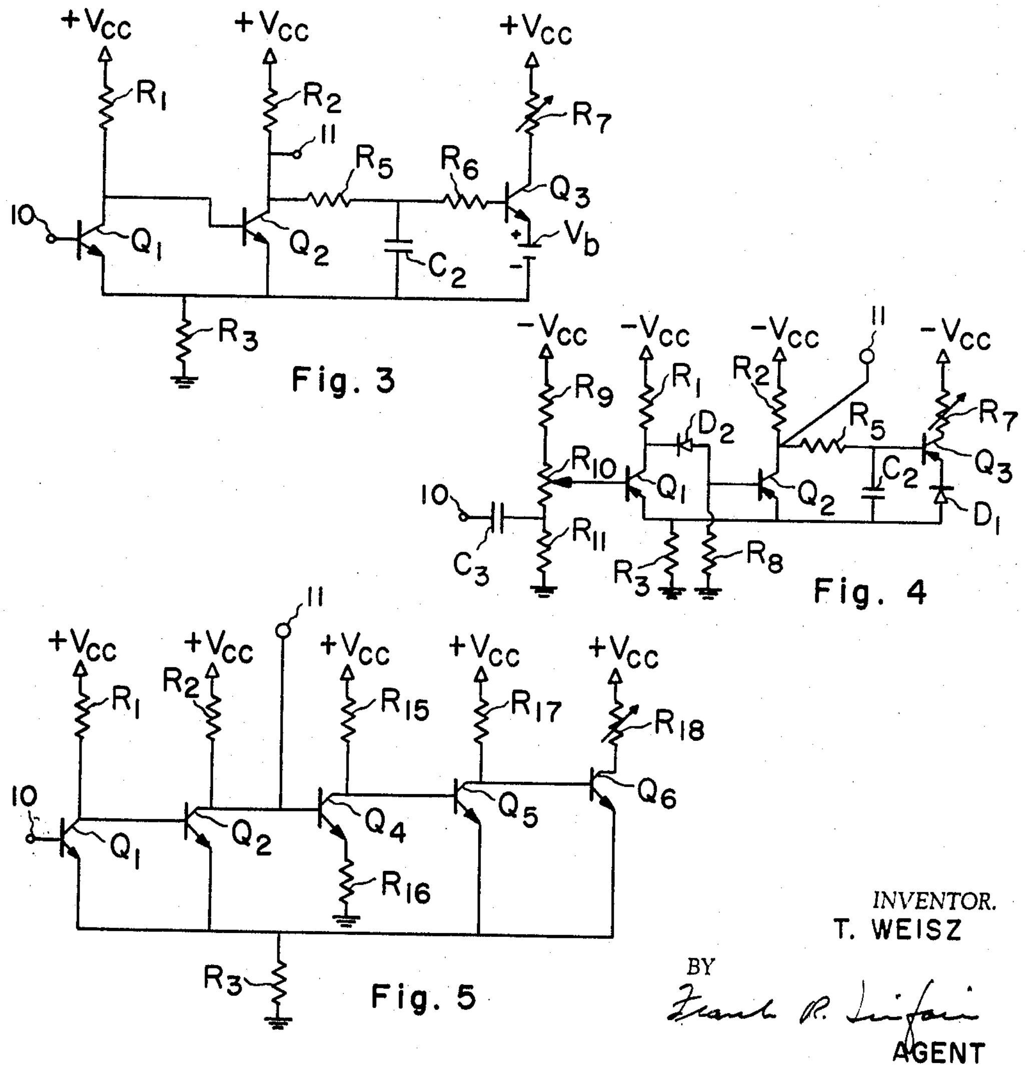

While the specification concludes with claims particularly pointing out and distinctly claiming the subject matter which I regard as my invention, it is believed that the invention will be better understood from the following description taken in connection with the accompanying drawings, in which: FIG. 1 is a circuit diagram of one basic form of a known Schmitt trigger circuit; FIG. 2 is a circuit diagram of a known modification of the circuit of FIG. 1 for reducing the effects of hysteresis; FIG. 3 is a circuit diagram of one embodiment of a Schmitt trigger circuit according to the invention, including means for controlling the hysteresis of the circuit;

FIG. 4 is a circuit diagram of a modification of the circuit of FIG. 3, and FIG. 5 is a circuit diagram of another embodiment of a Schmitt trigger circuit according to the invention.

Referring now to the drawings, FIG. 1 illustrates one form of a basic Schmitt trigger circuit. In this circuit, an input terminal 10 is connected to the base of a transistor $Q_1$, and the collector of transistor $Q_1$ is directly connected to the base of transistor $Q_2$. The collector resistor $R_1$ of transistor $Q_1$, and the collector resistor $R_2$ of transistor $Q_2$ are connected to one terminal $V_{cc}$ of a source of operating potential, and a common emitter resistor $R_3$ is connected to ground. An output signal may be obtained from a terminal 11 connected to the collector of transistor $Q_2$.

In this circuit, when the voltage applied to the input terminal is below a predetermined valve $V_1$, the transistor $Q_2$ will conduct and produce a voltage drop $V_2$ across the common emitter resistor $R_3$. Assuming that transistor $Q_2$ is saturated so that the voltage drops in this transistor may be neglected, the resistors $R_1$ and $R_2$ are effectively in parallel, so the voltage drop across $R_3$ is dependent in part upon the resistance of $R_1$. If the input voltage now increases to $V_1 = V_2 + v$, wherein $v$ is the base-emitter threshold voltage of transistor $Q_1$, the transistor $Q_1$ will start to conduct. If the positive feedback by way of resistor $R_3$ is sufficiently high, transistor $Q_1$ will be driven to saturation and transistor $Q_2$ will be cut off at a high switching speed. The resistor $R_3$ will now be in series effectively only with resistor $R_1$, when the input voltage approaches the threshold level, to produce a voltage drop $V_3$ across resistor $R_3$ which is lower than the voltage $V_2$. In order to cut off transistor $Q_1$, the input voltage must thus drop to a lower voltage than $V_1$, so that the threshold voltage, for changing the conduction conditions in the circuit are dependent upon the direction in which the input voltage changes. This effect is known as hysteresis.

The hysteresis effect can be reduced, as shown in FIG. 2, by including a resistor $R_4$ in series with the base lead of $Q_2$ and making resistor $R_1$ equal resistor $R_2$, so that the voltage $V_2$ is less dependent upon the base circuit resistance of transistor $Q_2$. The resistor $R_4$, however, lowers the circuit gain so that the switching time of the circuit in response to an input voltage change is increased. The increase in switching time may be overcome by the use of a capacitor $C_1$ in parallel with the resistor $R_4$, but this capacitor introduces a time constant in the circuit that reduces the cycle time, i.e. the minimum time that the circuit can pass through both conduction states and be prepared to respond to a new change of the input voltage. Thus, while the circuit of FIG. 2 reduces the hysteresis effect, the additional components required introduce time delays. In addition, in the circuit of FIG. 2, the hysteresis is a function of the characteristics of the transistors, which may vary on the time (aging) and temperature. This circuit is also unstable for D.C. input voltages as a result of the finite base-emitter resistance of transistor $Q_1$. (This problem is not present in the circuit of FIG. 1 since resistor $R_1$ can be made large enough to ensure cutting off of transistor $Q_2$, thus providing stable operation.)

Referring now to FIG. 3, according to one embodiment of the present invention, the circuit of FIG. 1 is modified by providing a transistor $Q_3$. The collector of transistor $Q_2$ is connected to the base of transistor $Q_3$ by series connected $R_5$ and $R_6$. A bias source $V_b$ is connected between the emitter of transistor $Q_3$ and the emitters of transistors $Q_1$ and $Q_2$. A capacitor $C_2$ is connected between the junction of resistors $R_5$ and $R_6$ and the emitters of transistors $Q_1$ and $Q_2$. The collector resistor $R_7$ of the transistor $Q_3$ is variable and is connected to $V_{cc}$.

In this circuit, when the input voltage is sufficiently low that transistor $Q_2$ is saturated, the emitter collector voltage of transistor $Q_2$ is lower than the sum of $V_b$ and the base-emitter threshold voltage of transistor $Q_3$, so transistor $Q_3$ is cut off. When the input voltage is increased to $V_1$ and transistor starts conducting, the conduction conditions of transistors will change as in the circuit of FIG. 1. Resistors $R_5$ and $R_6$, the capacitor $C_2$, and the input capacitance of transistor $Q_3$ form a time delay network with a time delay sufficiently long that transistor $Q_3$ does not start to conduct until the switching of transistors $Q_1$ and $Q_2$ has been completed.

The circuit of transistor $Q_3$ thus does not interfere with the switching of transistors $Q_1$ and $Q_2$ when the input voltage is increasing and the switching speed of the original Schmitt trigger circuit is preserved. Similarly, when transistors $Q_1$ and $Q_3$ are conducting and transistors $Q_2$ is nonconductive, a transition of conducting states of the transistors $Q_1$ and $Q_2$ resulting from a decrease of the input voltage will not be affected by the presence of transistor $Q_3$ since the time delay network will hold the transistor $Q_3$ in its conductive state until the switching has been completed.

When the transistor $Q_3$ becomes conductive, its emitter current flows in common emitter resistor $R_3$, and this current can be controlled by varying the resistance of collector resistor $R_7$. By varying the value of resistor $R_1$, the voltage drop across $R_3$ when transistors $Q_1$ and $Q_3$ are conducting can be made the same as the voltage drop $V_2$ when only the transistor $Q_2$ is conducting. The hysteresis of the circuit may be thus made equal to zero, or if desired, it can be made negative (with a sufficiently high rate of rise of the input voltage) or positive, by a single adjustment. Since the transistor $Q_3$ is not conductive during the transition period of switching of transistors $Q_1$ and $Q_2$, the circuit of transistors $Q_1$ and $Q_2$ can be designed to provide a maximum switching speed. By design of the time delay network so that the transistor $Q_3$ becomes conductive (or non-conductive) as soon as possible after the switching of transistors $Q_1$ and $Q_2$, and the cycle time of the circuit is not substantially increased. The control of hysteresis in this circuit is almost immune to transistor characteristics.

In the modification of the circuit of FIG. 3 shown in FIG. 4, the resistor $R_6$ has been omitted since the base resistance of transistor $Q_3$ can serve the same function. The source $V_b$ has been replaced by a diode $D_1$ poled in the same direction as the base-emitter rectifier of transistor $Q_3$ to provide a sufficient threshold level that transistor $Q_3$ will not conduct when transistor $Q_2$ is saturated. Similarly, a diode $D_2$ has been inserted between the collector of $Q_1$ and the base of $Q_2$ to provide a sufficient threshold level that transistor $Q_2$ will not conduct when transistor $Q_1$ is saturated. The base of transistor $Q_2$ is connected to the bottom of resistor $R_3$ by means of resistor $R_2$. The input circuit comprises a voltage divider of resistor $R_9$, potentiometer $R_{10}$, and resistor $R_{11}$, with the input terminal being connected by way of capacitor $C_3$ to the junction of resistor $R_{11}$ and potentiometer $R_{10}$. The arm of potentiometer $R_{10}$ is connected to the base of transistor $Q_1$ to permit adjustment of the triggering level. A circuit according to FIG. 4 was constructed using the following components: $R_1$—22K ohms; $R_2$—2.2K ohms; $R_3$—47 ohms; $R_5$—100K ohms; $R_7$—2.5K ohms; $R_8$—22K ohms; $R_9$—1.2K ohms; $R_{10}$—200 ohms; $R_{11}$—47 ohms; $C_2$—500 pf.; $C_3$—1 mf.; $Q_1$—2N1304; $Q_2$—2N1304; $Q_3$—2N1305; $D_1$—1N617; $D_2$—1N457; $V_{cc}$—6 volt source. This circuit was employed successfully as a detector for half sine wave signals of 200 nanosecond duration and 10 millivolt magnitude at a repetition rate of 2 megacycles. The rise and fall times of the output voltage were 20 nanoseconds.

In a variation of the circuit of FIG. 4, as shown in FIG. 5, the current in the resistor $R_3$ is adjusted by means of an additional trigger circuit. The collector of transistor $Q_2$ in this case is connected to the base of a transistor $Q_4$ connected as an inverter amplifier. The collector resistor $R_{15}$ is connected to $V_{cc}$ and the emitter resistor $R_{16}$ of the inverter is connected to ground. The inverted output at the collector of transistor $Q_4$ is connected to the base of a transistor $Q_5$, and the collector of transistor $Q_5$ is connected to the base of transistor $Q_6$. The collector resistors $R_{17}$ and $R_{12}$ of transistors $Q_5$ and $Q_6$ respectively are connected to the source $V_{cc}$. The emitters and transistors $Q_5$ and $Q_6$ are connected to the emitter resistor $R_3$.

The transistors $Q_5$ and $Q_6$ comprise a second Schmitt trigger circuit coupled by the inverter $Q_4$ so that transistors $Q_2$ and $Q_5$ conduct at the same time, and transistors $Q_1$ and $Q_6$ conduct at the same time. The voltage drop across common emitter resistor $R_3$ can be varied by varying the collector resistor $R_{18}$ of transistor $Q_6$ in order to obtain any desired hysteresis effect. In this circuit, the inverter transistor $Q_4$ is also to act as a circuit delay so that the second Schmitt trigger does not interfere wih the switching action of transistors $Q_1$ and $Q_2$. The transistor $Q_4$ is operated in saturation, and is selected to have a storage time greater than the switching time of the circuit of transistors $Q_1$ and $Q_2$. The circuit provides the advantage of a less critical delay circuit, but the cycle time is increased since it must now include the switching time of the second trigger circuit. In a practical embodiment of the circuit of FIG. 5, operating in the non-saturating mode, sinusoidal input singals of 15 megacycles were successfully detected with a resolution of one milivolt.

While the invention has been described with reference to specific examples, it is obvious that many modifications may be made without departing from the spirit or scope of the invention. Thus, for example, the invention may be employed in vacuum tube circuits. Similarly, additional components may be employed in the circuit according to the invention in order to prevent saturation of the transistors, according to conventional practices, without deparing from the teaching of the invention, and it is intended in the appended claims to cover all such changes as fall within the true spirit and scope of the invention.

I claim:

1. A trigger circuit comprising means for defining a bistable trigger circuit including cascaded alternately switched first and second amplifying means each having a common electrode coupled together, a common impedance coupled to said common electrodes, and means for compensating hysteresis effects in said trigger circuit comprising a time delay means having a time delay greater than the switching speed of said first and second amplifying means and having an output and having an input coupled to said second amplifying means, and means for increasing the current flow in said common impedance when said first amplifying means is conducting comprising third amplifying means coupled to the output of said delay means and having a common electrode coupled to the beforesaid common electrodes.

2. A circuit as claimed in claim 1 wherein said amplifying means and said common electrodes comprise transistors having emitters respectively.

3. A circuit as claimed in claim 1 wherein said delay means comprises a series resistor shunt capacitor network.

4. A circuit as claimed in claim 1 wherein said common impedance comprises a resistor.

5. A circuit as claimed in claim 1 further comprising means for biasing coupled in series with the common electrode of said third amplifying means.

6. A circuit as claimed in claim 1 further comprising means for adjusting the amount of hysteresis compensation.

7. A circuit as claimed in claim 1 wherein said time delay means comprises an inverter amplifier and said third amplifying means comprises cascaded alternately switch fourth and fifth amplifying means each having a common electrode coupled to the beforesaid common electrodes.

8. A circuit as claimed in claim 7 wherein said amplifying means and said common electrodes comprise transistors having emitters respectively.

9. A circuit as claimed in claim 7 further comprising means for adjusting the amount of hysteresis compensation.

References Cited

UNITED STATES PATENTS

| | | | |
|---|---|---|---|
| 2,987,632 | 6/1961 | Milford | 307—293 |
| 3,123,721 | 3/1964 | Kaufman | 307—235 |
| 3,249,767 | 5/1966 | Zeller | 328—203 |
| 3,281,608 | 10/1966 | Doyle | 307—235 |
| 3,317,908 | 5/1967 | Schoneborn | 307—235 |
| 3,324,309 | 6/1967 | Zeller | 307—290 |

JOHN S. HEYMAN, Primary Examiner

H. A. DIXON, Assistant Examiner